(No Model.) 3 Sheets—Sheet 1.
E. A. CLARK, J. P. ELLACOTT & W. J. O. JOHNSON.
SYSTEM OF ELECTRICAL INTERCOMMUNICATION.
No. 582,578. Patented May 11, 1897.
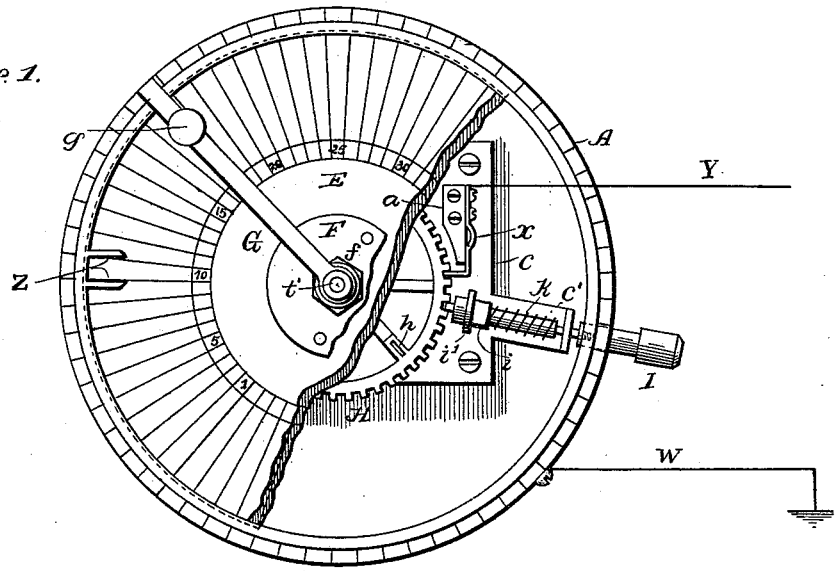
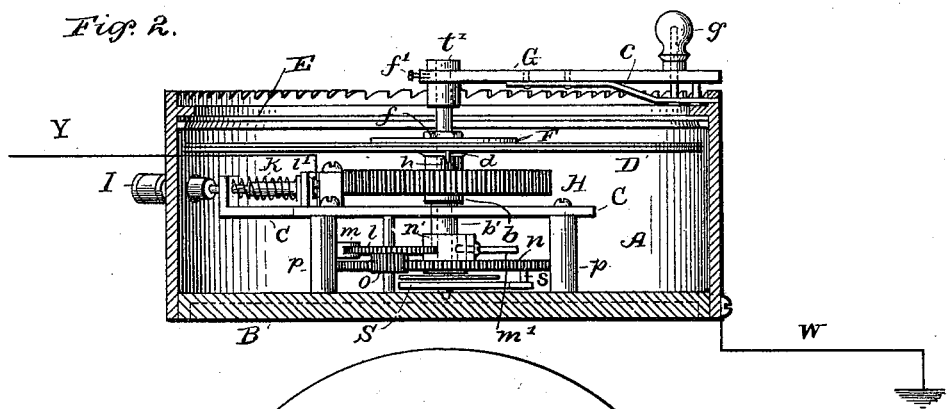
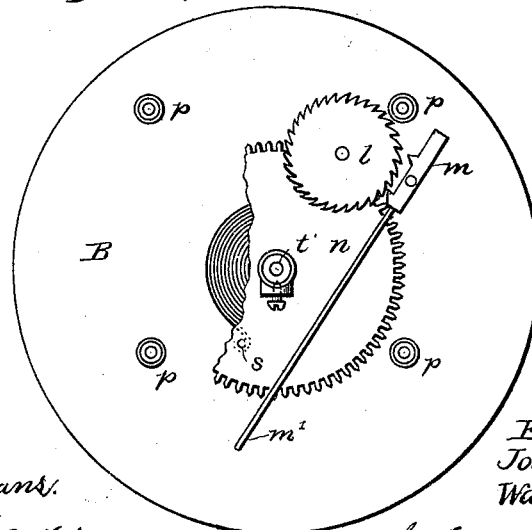
Witnesses
Victor J. Evans.
O. E. Braitmayer
Inventors
Emery A. Clark.
Joseph P. Ellacott.
Walter J. O. Johnson.
by E. H. Markl & Sons Attorneys

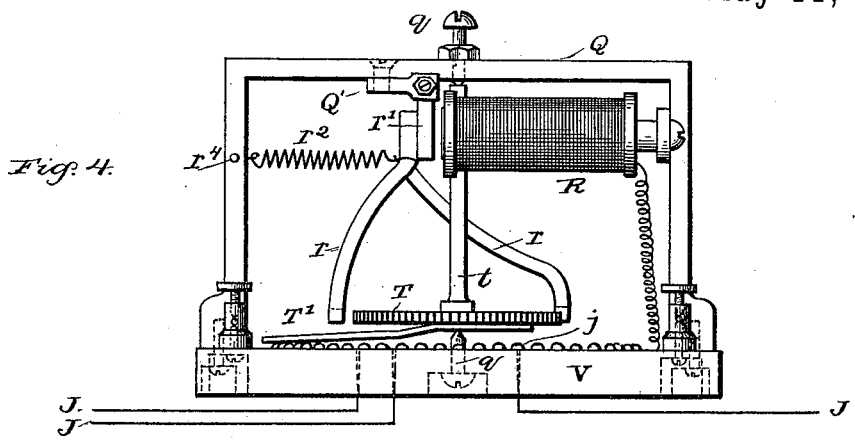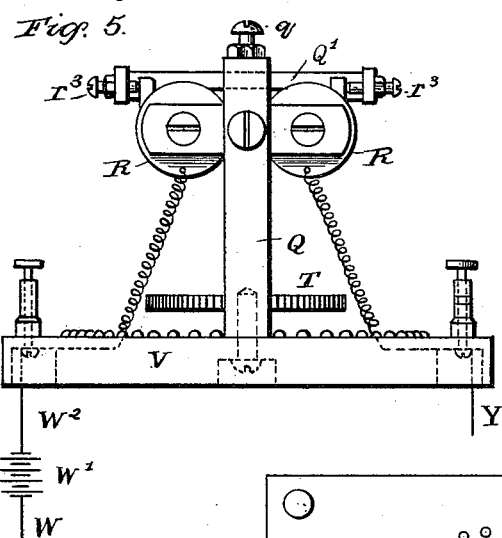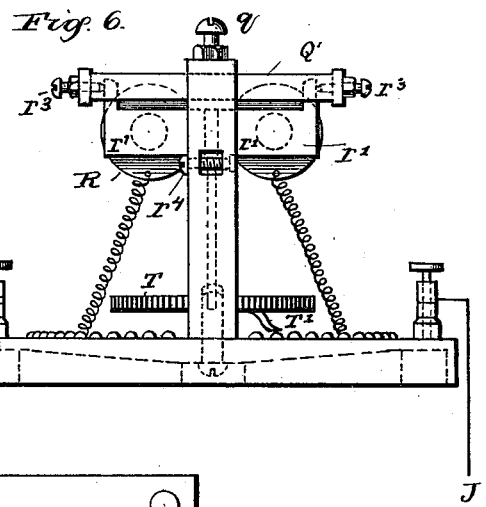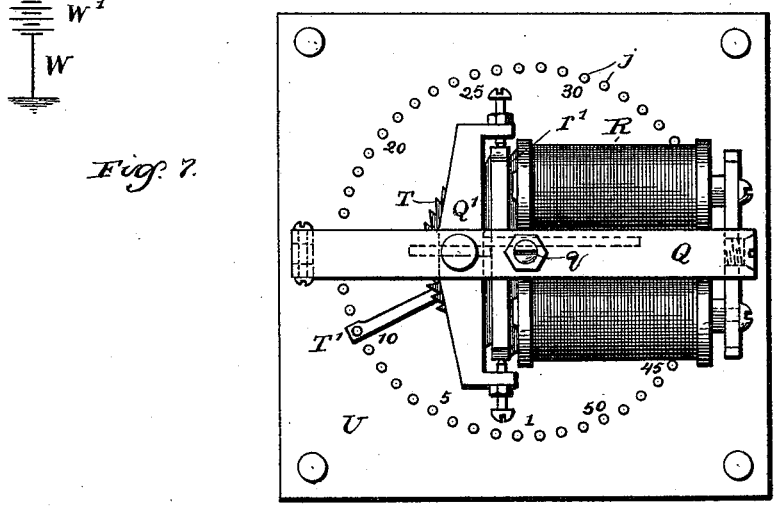

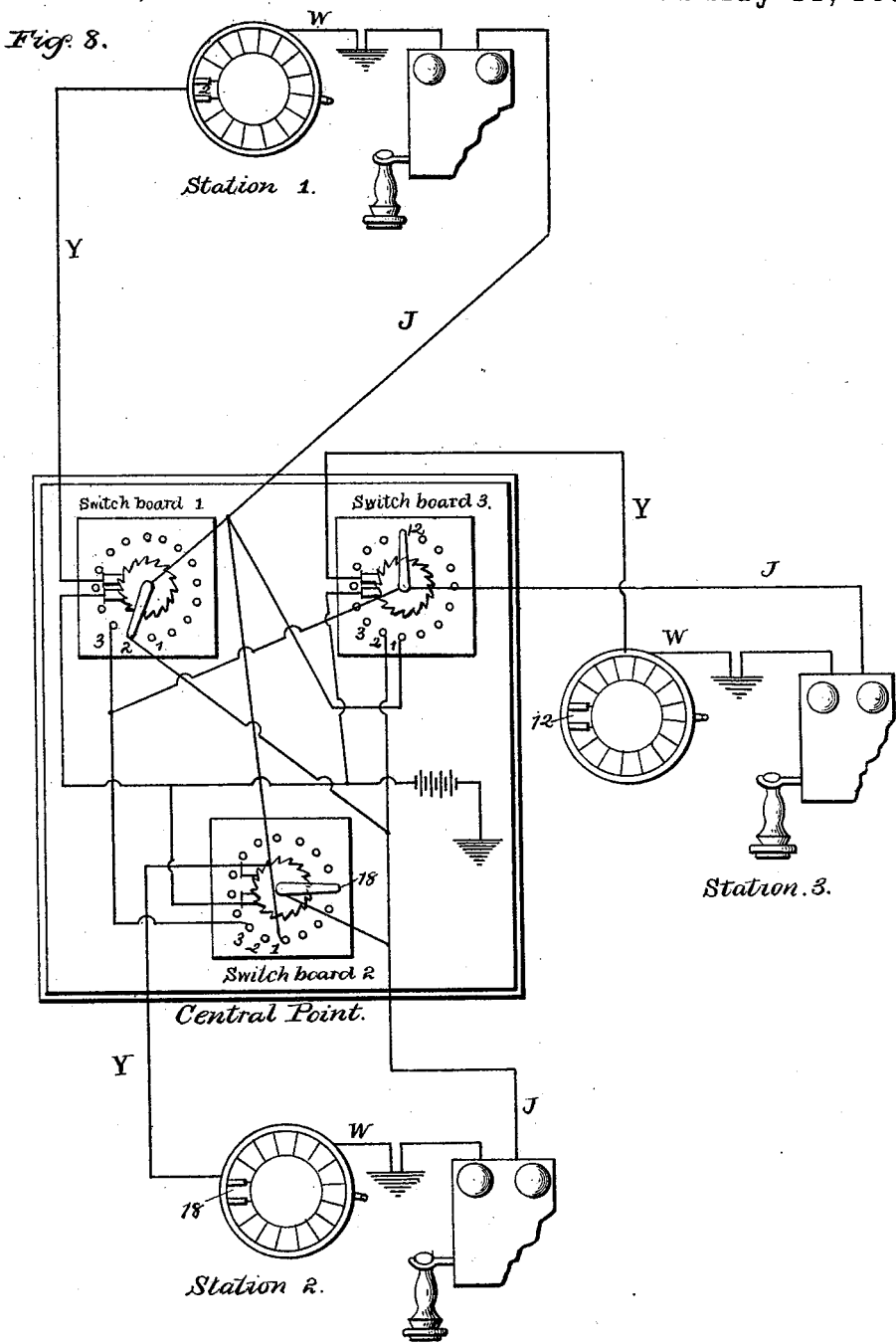

UNITED STATES PATENT OFFICE.

EMERY A. CLARK, OF SIOUX CITY, IOWA, AND JOSEPH P. ELLACOTT AND WALTER J. O. JOHNSON, OF CHICAGO, ILLINOIS.

SYSTEM OF ELECTRICAL INTERCOMMUNICATION.

SPECIFICATION forming part of Letters Patent No. 582,578, dated May 11, 1897.

Application filed September 28, 1893. Serial No. 486,743. (No model.)

*To all whom it may concern:*

Be it known that we, EMERY A. CLARK, residing at Sioux City, in the county of Woodbury and State of Iowa, and JOSEPH P. ELLA-COTT and WALTER J. O. JOHNSON, residents of Chicago, in the county of Cook, in the State of Illinois, citizens of the United States, have invented a new and useful Improvement in Systems of Electrical Intercommunication, of which the following is a specification.

Our invention relates to improvements in systems of electrical intercommunication, and more particularly to improvements in that class thereof in which the switch mechanisms used are automatically operated by the several subscribers at will to place themselves in communication with each other; and it consists in novel features in the construction of the transmitter and receiver, which will be hereinafter fully described, and particularly pointed out in the claims.

Our invention is especially intended for use in connection with automatic systems of electrical intercommunication of the character described in patent granted to Emery A. Clark on May 30, 1893, No. 498,236. In this system all of the receivers used are located at a central point and are interconnected, so as to form a switchboard, and the transmitters are located at the outlying points of the system in direct communication with the service instruments, so that any subscriber can place himself in communication with any other subscriber in the system by manual operation of his transmitter and without the need of an attendant at the switchboard to make connections.

One object of our invention is to provide an improved transmitter by means of which each subscriber can more conveniently and surely place himself in communication with the party desired or can indicate his wants at a central point.

A further object of our invention is to provide a receiver of novel construction by the action of which greater certainty will be attained in the operation of the system described in the above-mentioned patent.

The transmitter which we have devised is adapted to operate in such a manner as to be always in unison with the receiver and so that in its normal operation it cannot be placed out of unison therewith. In our device the movement of the indicator through its prescribed path is in its usual operation always forward and never backward. The electrical contacts necessary to bring about any desired connection or call are made during a continuous forward movement of the circuit making and breaking mechanism, and as the number of contacts which the circuit making and breaking mechanism makes when traveling through a complete cycle of movement is equal to the number of positions which the receiver is adapted to assume it will be apparent that there is a constant unison in position between the circuit making and breaking device of the transmitter and the switch of the receiver.

In the operation of our device the indicator is set at a point in its path corresponding with the movement which the circuit making and breaking mechanism must have in order to make the desired connection, and then the circuit making and breaking mechanism is caused by suitable actuation to move to a position corresponding to that occupied by the indicator.

In the form in which we have embodied our invention there is a power connection between the indicator and the circuit making and breaking mechanism which we employ of such character that by the forward movement of the indicator sufficient power is stored to move the circuit making and breaking mechanism after each setting of the indicator to a position corresponding to that occupied by the same. The power device which we preferably use is a spring attached at one end through intermediate mechanism to the circuit making and breaking wheel and at the other end to the shaft on which the indicator-dial is mounted. Escapement mechanism is provided to make the forward movement of the circuit making and breaking wheel uniform, and stops are provided on the circuit making and breaking wheel and on the movable indicator, which are in the same path, and are adapted to collide when the circuit making and breaking mechanism has moved to a position corresponding to that occupied by the indicator. The movement of such circuit making and breaking mechanism, and thereby the number of contacts which it may make, thus positively limited.

The features of our invention which relate to improvements in the construction of the receiver which we employ will be hereinafter specifically stated.

Our invention is fully illustrated in the drawings which accompany and form a part of this application, in which the same reference-letters refer to the same or corresponding parts, and in which—

Figure 1 is a top plan view of the transmitter, part of the indicator-dial being broken away to show the construction and operation of the circuit making and breaking wheel. Fig. 2 is a side view of the transmitter with the case broken away. Fig. 3 is a detail view of the escapement mechanism, showing also the spring which effects the movement of the circuit making and breaking wheel. Fig. 4 is a front elevation of the receiver. Fig. 5 is a view of the receiver, taken from the rear end of the magnets. Fig. 6 is a corresponding view looking at the front of the receiver and showing the trunnioned armature. Fig. 7 is a top plan view of the receiver, showing particularly the circularly-arranged contact-points with which the spring carried by the switch-wheel is adapted to contact. Fig. 8 is a diagrammatic view showing an exchange of three transmitters and receivers and the connections.

We have stated that our invention relates to improvements in the transmitter and the receiver. In the following description these mechanisms will be treated in the order named, and then the operation of the exchange system as a whole will be considered.

*Transmitter.*— The main feature of our transmitter is that the movement of the circuit making and breaking mechanism is in its normal operation continuously forward, that an indicator is employed which is adapted to be set in advance of the circuit making and breaking mechanism at a position corresponding to that to which such mechanism is desired to be moved, and that power connection is provided between the indicator and the circuit making and breaking mechanism adapted to move such mechanism after each setting of the indicator to a position corresponding to that occupied by the same.

Referring to Figs. 1, 2, and 3, A represents the case of the transmitter. This case is made of any suitable material, but is preferably made of nickel-plated metal, so as to present a neat and attractive appearance. The case, as shown, is circular in form and is provided with a bottom or bed plate B, secured thereto in any suitable manner. Centrally within the bottom or bed plate B is pivotally mounted a shaft $t'$, which has its lower bearing in a recess or depression in the bottom or bed plate and passes upward through an opening formed in the center of the plate C, such plate being supported by pillars $p$, which rest against the bed-plate, as shown. To the shaft $t'$ is keyed the revoluble indicator D and the crank-arm G, by means of which such indicator is moved to any desired position, and upon such shaft is loosely mounted the circuit making and breaking wheel H and the escapement mechanism, the escapement mechanism being situated entirely beneath the plate C. The indicator consists in our present form of the dial D, which carries the names or numbers of the members of the exchange. We prefer to make this dial of metal and to print the names on a paper dial held in place by the circular plate F, which is pressed to its place by the bur acting upon a short threaded sleeve $f$, rigidly fastened to the shaft and headed below plate D. The dial may be covered by a glass plate E, through the center of which an opening is formed to permit the passage of the end of the shaft $t'$. The dial is moved with reference to a fixed point in the case, (indicated by the index-pins Z, these pins being placed sufficiently far apart to permit the reception between them of any one of the names or numbers indicated upon the dial.) The movement of the dial and of the shaft to which it is keyed is effected by the lever-arm G, which extends outward to the periphery of the case, and is provided with a spring $c$ on its lower surface to engage in a circular series of notches formed on the upper edge of the case. The knob $g$ permits of convenient operation of the lever-arm G and enables the dial to be readily and quickly carried around to any desired point.

Upon its under surface the dial-plate is provided with a projecting lug or stop $d$, which moves in a circular path and with which the stop $h$, projecting upward from the circuit making and breaking wheel H, is adapted to collide.

The circuit making and breaking wheel H is loosely mounted on the shaft $t'$ and is formed with a sleeve $b$, which extends downward around the shaft, so as to rest upon the upper surface of the plate C and form a lower bearing for the circuit making and breaking wheel. The sleeve $b$ is provided with a downward extension $b'$, which is adapted to be secured in a suitable manner to the principal wheel of the escapement or retarding mechanism.

The circuit making and breaking wheel H is provided with a number of teeth, cogs, or projections on its periphery equal in number to the number of names or numbers upon the dial-plate or the contact-points on each receiver—viz., the maximum number of subscribers in the system. With the teeth of the circuit making and breaking wheel there engages a pointed contact-spring $x$, which is secured to an insulated base $a$, as shown, (such base being secured to the plate C in a suitable manner,) and which is made a part of the transmitter-circuit by the leading-wire Y, such wire being insulated from the case. The contact-spring $x$ forms, therefore, one branch of the circuit. The case A, and thereby the circuit making and breaking wheel H and the parts connected therewith, are in the other branch of the circuit by means of the leading-wire W, which in the construction shown is grounded. It is apparent, therefore, that every movement of the circuit making and breaking wheel will cause the circuit to be broken and made successively as each tooth passes the pointed contact-spring $x$ and will thereby convey an actuating impulse to the receiver, which will cause the switch-wheel of the same to move to a position corresponding to that occupied by the circuit making and breaking wheel.

The circuit making and breaking wheel is normally held stationary by the spring-pressed plunger I, which extends outside the case and may by hand be removed from engagement with the circuit making and breaking wheel in order to permit revolution of the same. The inner end of the plunger I passes through bearing-studs $i'$, formed on the upper surface of a projecting portion $c'$ of the plate C. The portion of the plunger I which passes through the inner bearing-stud $i'$ is preferably squared, as shown at $i$, in order that there may be no slipping or turning of the plunger in its operation. The spring $k$ encircles a portion of the plunger I and has its bearing against the squared portion $i$ of the plunger I and the bearing-stud $i'$, so that the spring normally tends to hold the plunger in engagement with the circuit making and breaking wheel and has to be retracted or drawn outward in order to free the circuit making and breaking wheel from engagement.

The revolution of the circuit making and breaking wheel is effected through the action of the coiled spring S, which is secured to the lower end of the shaft $t'$; but as such spring is not secured directly to the circuit making and breaking wheel H, but to the stud $s$, projecting from the lower surface of one of the wheels of the escapement mechanism, it will be convenient, before considering the action of such spring, to first describe the construction and operation of the escapement mechanism.

The escapement mechanism consists of a gear-wheel $n$, mounted upon the central shaft $t'$, and the gears and pinions in connection therewith. The gear-wheel $n$ is provided with a sleeved portion $n'$, which directly encircles the shaft and which extends upward and is of sufficient size to receive the lower portion $b'$ of the sleeve $b$ of the circuit making and breaking wheel H, so that the sleeve of the circuit making and breaking wheel and of the gear-wheel $n$ may be rigidly secured to each other by a binding-screw, as shown. With the gear-wheel $n$ engages the pinion $o$, which is supported upon a suitable shaft, which also carries the ratchet or escapement wheel $l$. With the teeth of the ratchet or escapement wheel $l$ engage the toothed projections on the pallet $m$, which is provided with a pendulum-arm $m'$, as shown. It will thus be seen that any movement of the circuit making and breaking wheel H results in a corresponding movement of the gear-wheel $n$, and thereby of the train in connection therewith. The action of the pallet upon the escapement-wheel $l$ is to regulate and govern the movement of the entire train of escapement mechanism, and thereby of the circuit making and breaking wheel H, and thus to make the movement of such circuit making and breaking wheel uniform and of any desired speed.

The spring S, which imparts the power required to cause the revolution of the circuit making and breaking wheel H, is secured at one end to the projecting stud $s$, formed on the escapement-wheel $n$, as previously described, and at the other end to the shaft $t'$. This spring is so adjusted that any forward movement of the dial-plate D increases the tension thereof, and thereby causes it to store power, which, when expended, will result in a movement of the circuit making and breaking wheel H corresponding to that through which the dial-plate has just passed. As the spring-pressed plunger I normally holds the circuit making and breaking wheel H locked from movement, however, movement of the circuit making and breaking wheel H does not immediately follow, in our present construction, the setting of the indicator, but takes place only when such plunger is withdrawn from engagement with the circuit making and breaking wheel. The circuit making and breaking wheel will then move to a position corresponding to that occupied by the indicator or until the stops $h$ and $d$ collide. The locking of wheel H during the setting of the indicator is in no wise an essential feature of our invention, nor is it necessary when such locking-plunger is used that the unlocking of the plunger be independent of the setting of the indicator. The form of device which we now use is only one of many which might be constructed upon the same principles of operation contained therein.

It is to be noted that in our present construction the crank and the dial, with the accompanying stop, move together, and the circuit making and breaking wheel and escapement mechanism have a movement independent of the indicator and correlative parts.

*Receiver.*—The receiver which we employ in connection with our transmitter is provided with a base-plate, of rubber or other insulating material, on which are formed in circular series contact-points in number equal to the maximum number of subscribers in the system, each of such contact-points forming a terminal of a service-wire connected to one of the outlying transmitters. Centrally within the series of contact-points we pivot a switch-wheel, which is controlled by a governing-electromagnet and from which extends a spring adapted to bear in succession upon each of the contact-points. The periphery of the switch-wheel is toothed, and each actuation of the electromagnet is adapted to drive the switch-wheel forward one tooth and thereby to carry the contact-spring from one contact-point to that next adjacent thereto. The number of teeth upon the switch-wheel, the number of contact-points upon the insulated base of the receiver, the number of teeth upon the periphery of the circuit making and breaking wheel of the transmitter, the number of positions or numbers upon the face of the dial, and the number of notches on the case of the transmitter are all the same, so that the switch-wheel, the circuit making and breaking wheel, and the revoluble dial-disk are always in unison.

It may be remarked that it is not absolutely necessary that the number of teeth upon the periphery of the circuit making and breaking wheel of the transmitter be equal to the number of positions or numbers upon the face of the dial of the transmitter, but only that they correspond in number to the number of such positions or numbers upon the face of the dial. The essential thing to be accomplished is to cause the circuit making and breaking wheel to move through a space corresponding to that passed through by the indicator after each setting of the same, and during such movement to actuate the circuit making and breaking mechanism a number of times equal to the number of positions or names passed by the indicator. While it is convenient for practical purposes in accomplishing this object to have an exact correspondence in number between the teeth of the circuit making and breaking wheel and the positions on the face of the dial, it is evident that the teeth on the transmitter may be in number any multiple of the positions on the face of the dial, so long as only one actuating impulse is transmitted by the circuit making and breaking wheel during the movement of the indicator through the space of one position.

The base of the receiver is indicated in the drawings, referring particularly to Figs. 4, 5, 6, and 7, by the reference-letter $v$. Upon it are formed in circular series the contact-points $j$, which extend downward through the base and form the terminals of service-wires J, leading to the outlying transmitters and connected not only to said transmitters, but to the switch-frames of the receivers belonging to the same. That is to say, speaking reversely, switch No. 1 has a wire attached to its frame, and branches thereof lead to contact-point No. 1 in each of all the other receivers in the system, contact-point No. 1 in receiver No. 1 remaining blank. Switch No. 2 is likewise connected by a wire through its frame, and so on through the whole system until they are all interconnected. The frame of switch No. 1 is connected by service-wire J with the service instrument of the subscriber whose name, number, or other designation is at point No. 1 on the dials of the transmitters.

Upon the base $b$ is secured the frame Q, which furnishes support for the electromagnets R and which is formed with a trunnion-bar Q', through the ends of which pass the screws $r^3$, which form pivotal supports for the armature $r'$. Centrally in the frame are formed apertures for the passage of the trunnion-screws $q$, which serve as supports for the axle $t$ of the switch-wheel T. The periphery of the switch-wheel T is toothed, the teeth being inclined in a given direction. From the under surface of the switch-wheel projects a spring T', which is adapted to sweep over the circular series of contact-points $j$ in succession at any given time, making contact with only a single one of such points. The armature $r'$ is normally held backward away from the electromagnets by the windlass $r^4$. From the armature extends downward the bifurcated lever $r$, whose points are V-shaped and are adapted to impinge upon the sloping surface of the cogs of switch-wheel T in such manner that each one of the bifurcated portions of the lever forces the switch-wheel forward a half a cog and so that the combined action of the two arms of the lever act to carry the switch-wheel forward with a step-by-step movement a complete cog at each forward and backward movement of the armature.

The circuit through the electromagnets R R is established by the transmitter-wire Y and the battery-wire $W^2$, which leads to the battery W' and is there grounded by the ground-wire W. In passing through the receiver mechanism the service-lines and switch-line are wholly insulated from each other.

*Operation of the system.*—The normal position of each of the receivers when not in use is such that the contact-spring T' thereof rests upon the point of the subscriber to whom the receiver belongs, which, as heretofore stated, is a blank, and the dial of the transmitter of each subscriber is in such position that the name of the user thereof is between the index-points Z. When a subscriber wishes to place himself in communication with any other subscriber, he turns the dial of his transmitter until the name of the subscriber with whom he wishes to place himself in communication appears between the index-points Z. The plunger I of the transmitter is then pulled out, and the circuit making and breaking mechanism is allowed to run to a position corresponding to that occupied by the dial, at which point the stops upon the upper surface of the circuit making and breaking wheel and on the lower surface of the dial collide. During this movement the circuit making and breaking wheel will have made a sufficient number of contacts to carry the switch-wheel of the receiver connected therewith to a position corresponding to that occupied by the circuit making and breaking wheel and so that the spring T' of the switch-wheel thereof will rest upon the contact-point belonging to the subscriber with whom he wishes to place himself in communication. The circuit thus established leads through the frame of the receiver belonging to the person with whom communication is desired to his service instrument, and thus completes the communication.

With the use of our system any desired number of subscribers can place themselves in communication by calling each other up in succession until they are all properly electrically interconnected.

While we have thus described our instruments as being used in systems of telephonic intercommunication, it is evident that they may also be used in annunciator systems, such as are used in hotels, in fire-alarm systems, or in any other kindred manner.

It is also evident that many changes may be made in the construction which we have herein described without departing from the spirit and scope of our invention, so that we do not wish to limit ourselves to the construction shown; but

What we claim as new, and desire to secure by Letters Patent, is—

1. In a transmitter, the combination with a rotary indicator adapted to be set in one or more positions in a prescribed path, and circuit-changing mechanism moving in a path, the center of movement of which corresponds to that in which said indicator moves, of a yielding connection between said indicator and said circuit-changing mechanism for causing movement of said circuit-changing mechanism in the direction of movement of the indicator, after each setting of the indicator, to a position corresponding to that occupied by the same, substantially as described.

2. In a transmitter, the combination with a central shaft, an indicator mounted thereon, and circuit-changing mechanism also mounted thereon, of a yielding connection between said indicator and said circuit-changing mechanism for causing movement of said circuit-changing mechanism in the direction of movement of the indicator, after each setting of the indicator, to a position corresponding to that occupied by the same, substantially as described.

3. In a transmitter, the combination with a central shaft, an indicator mounted thereon, and a circuit-changing wheel also mounted thereon, of a yielding connection between said indicator and said wheel for causing movement of said wheel in the direction of movement of the indicator, after each setting of the indicator, to a position corresponding to that occupied by the same, and contact mechanism operated by said wheel, substantially as described.

4. In a transmitter, the combination with a central shaft, an indicator mounted thereon, and a wheel having a toothed periphery, the teeth of which correspond in number to the different positions occupied by the indicator, also mounted thereon, of a yielding connection between said indicator and said wheel for causing movement of said wheel in the direction of movement of the indicator, after each setting of the indicator, to a position corresponding to that occupied by the same, and contact mechanism operated by said wheel, substantially as described.

5. In a transmitter, the combination with a central shaft, an indicator-disk mounted thereon, and circuit-changing mechanism also mounted thereon, of a yielding connection between said indicator and said circuit-changing mechanism for causing movement of said circuit-changing mechanism in the direction of movement of the indicator, after each setting of the indicator, to a position corresponding to that occupied by the same, substantially as described.

6. In a transmitter, the combination with a central shaft, a disk having thereon the names, numbers or other designations of the connections desired to be established mounted thereon, and a circuit-changing wheel also mounted thereon, of a power-storing spring connected to said indicator and to said wheel and forming a yielding connection between the same, whereby movement of said indicator results in movement of said wheel corresponding in direction and amount to the movement of said indicator, and a contact-spring bearing against the periphery of said wheel, substantially as described.

7. In a transmitter, the combination with a case, a fixed point designated thereon, an indicator-disk having thereon the names, numbers or other designations of the connections desired to be established, mounted thereon, and a wheel having a toothed periphery, the teeth of which correspond in number to the different positions occupied by said indicator, also mounted thereon, of a spring connected with said indicator and said wheel, whereby movement of said indicator results in corresponding movement of said wheel, and a contact-spring bearing against the periphery of said wheel, substantially as described.

8. In a transmitter, the combination with a case having a toothed upper edge, a central shaft, the arm G keyed thereto and engaging the upper edge of said case, the indicator-disk E, also keyed thereto, and the circuit making and breaking wheel H loosely mounted thereon, of the spring S connected to said indicator and said wheel, whereby movement of said indicator results in corresponding movement of said wheel, and the contact-spring $x$ bearing against the periphery of said wheel, substantially as described.

9. In a transmitter, the combination with an indicator adapted to be set in one or more positions in a prescribed path, circuit making and breaking mechanism movable in the same or a corresponding path, and stops carried by said indicator and by said circuit making and breaking mechanism adapted to engage each other, of means for causing movement of said circuit making and breaking mechanism, after each setting of said indicator, to a position corresponding to that occupied by the same, substantially as described.

10. In a transmitter, the combination with an indicator adapted to be set in one or more positions in a prescribed path, a revoluble wheel, and stops carried by said indicator and said wheel adapted to engage each other, of means for causing movement of said wheel, after each setting of said indicator, to a position corresponding to that occupied by the same, substantially as described.

11. In a transmitter, the combination with a revoluble indicator adapted to be set in one or more positions in a prescribed path, a revoluble wheel, and stops carried by said indicator and said wheel adapted to engage each other, of means for causing movement of said wheel, after each setting of said indicator, to a position corresponding to that occupied by the same, substantially as described.

12. In a transmitter, the combination with a revoluble indicator, of a revoluble wheel, power-storing connection between said indicator and said wheel capable of operating only during the forward movement of said indicator in one direction, whereby forward movement of said indicator results in corresponding movement of said wheel, and a locking device engaging said wheel, substantially as described.

13. In a transmitter, the combination with a revoluble indicator, of a revoluble wheel, a spring connected with said indicator and said wheel capable of storing power only during the forward movement of said indicator in one direction, whereby forward movement of said indicator results in corresponding movement of said wheel, and a locking device engaging said wheel, substantially as described.

14. In a receiver, the combination with a base having a circular series of contact-points thereon, of a frame mounted on said base, electromagnets supported thereby, a switch-wheel journaled in said frame, a shaft therefor extending between said electromagnets, a pivoted armature, and a bifurcated lever attached thereto adapted to engage said switch-wheel and impart rotation thereto, substantially as described.

15. In electrical systems of intercommunication, the base $v$ supporting the frame Q, the trunnioned armature $r'$, the bifurcated lever $r$, with its controlling-spring $r^2$, the magnets R R, the switch-wheel T, trunnioned as shown and provided with the contact-spring T', and the circle of contact-points $j\,j$, substantially as described.

16. In electrical systems of intercommunication, the combination of the switch-wheel T, its shaft $t$ and trunnions $q\,q$, its contact-spring T' or its equivalent, the contact-points $j\,j$, the magnets R R, the armature $r'$, hung on the trunnions $r^3$, the bifurcated lever $r$, the frame Q, or its equivalent, mounted on the base $v$, the service-wires J J J, the switching-wire Y, the battery-wire $W^2$, the grounded battery $W'$, all substantially as described.

EMERY A. CLARK.
JOSEPH P. ELLACOTT.
WALTER J. O. JOHNSON.

Witnesses to signature of Emery A. Clark:
O. C. SLADE,
J. F. KIMBALL.

Witnesses to signatures of Joseph P. Ellacott and Walter J. O. Johnson:
BENJN. MARSH,
J. T. ROWAN.